C. E. WHITE.
HARROW.
APPLICATION FILED JUNE 14, 1907.
1,020,530.
Patented Mar. 19, 1912.
3 SHEETS—SHEET 1.
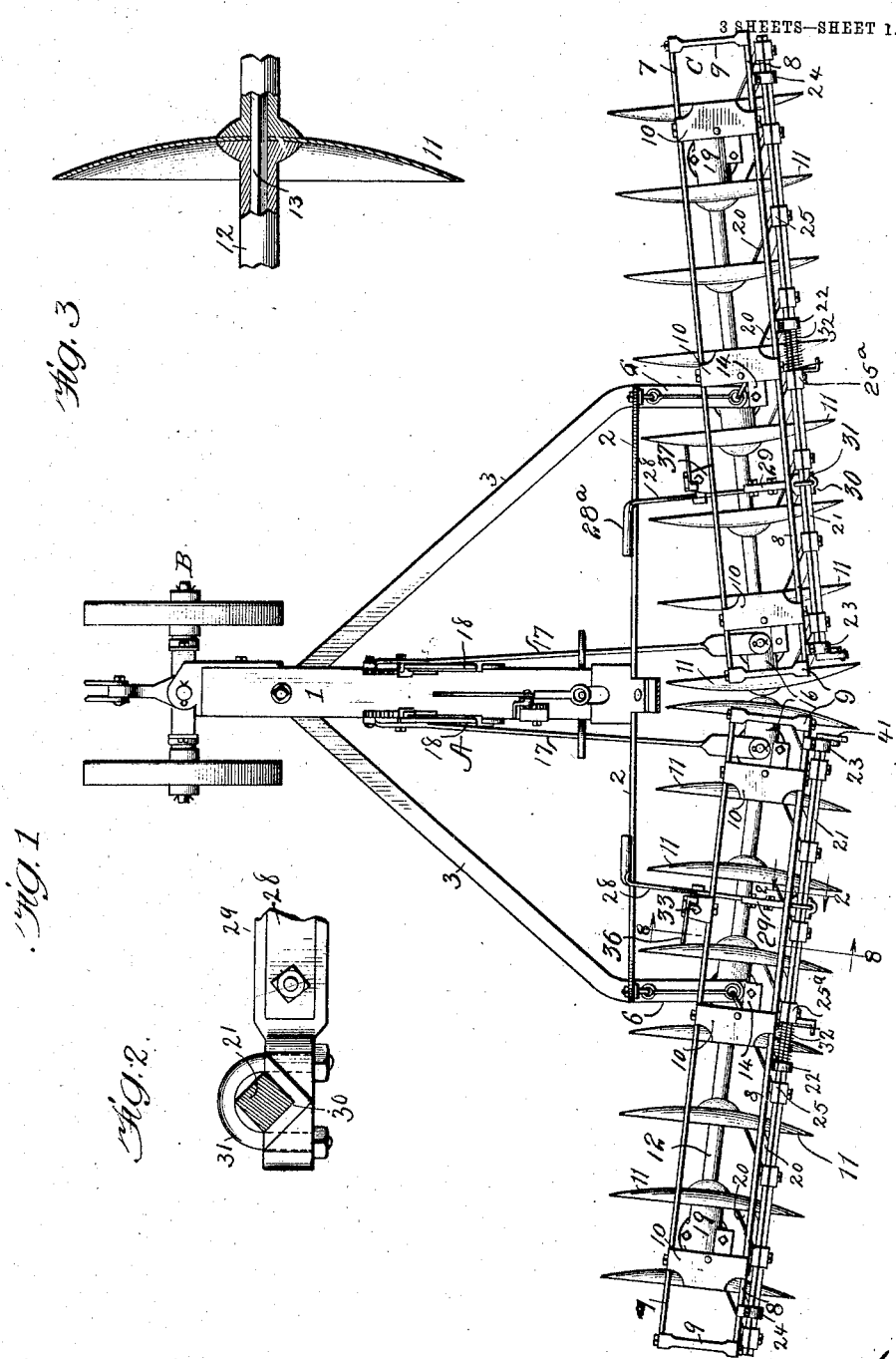

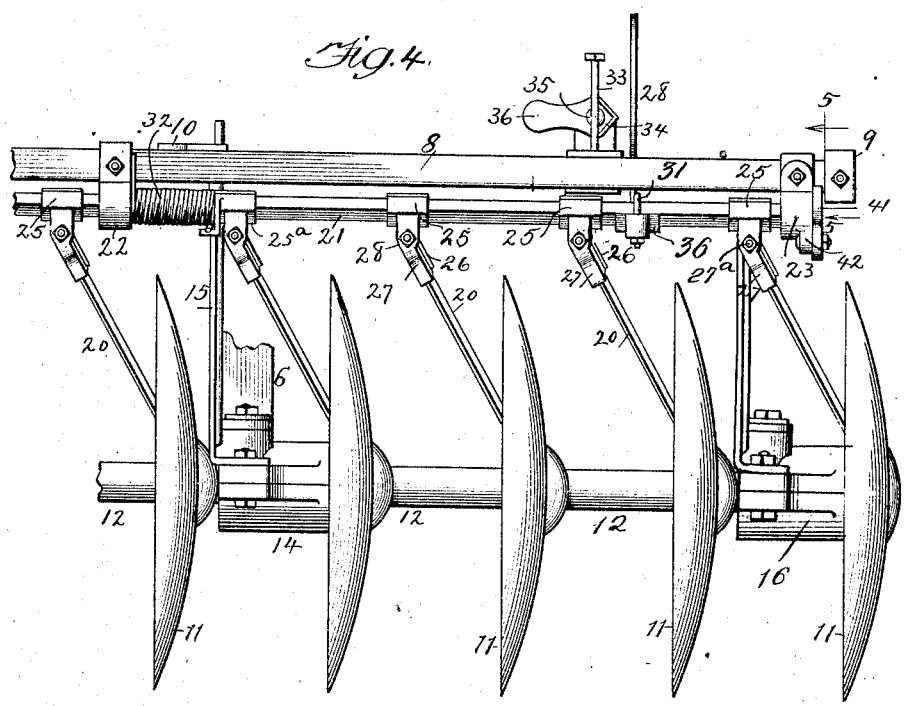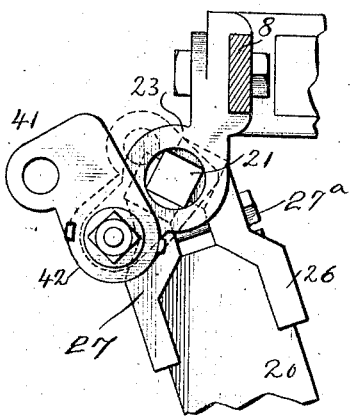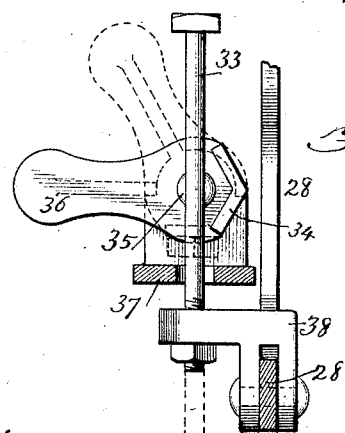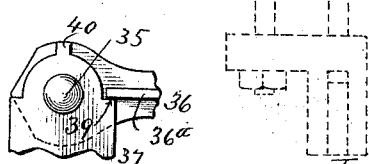

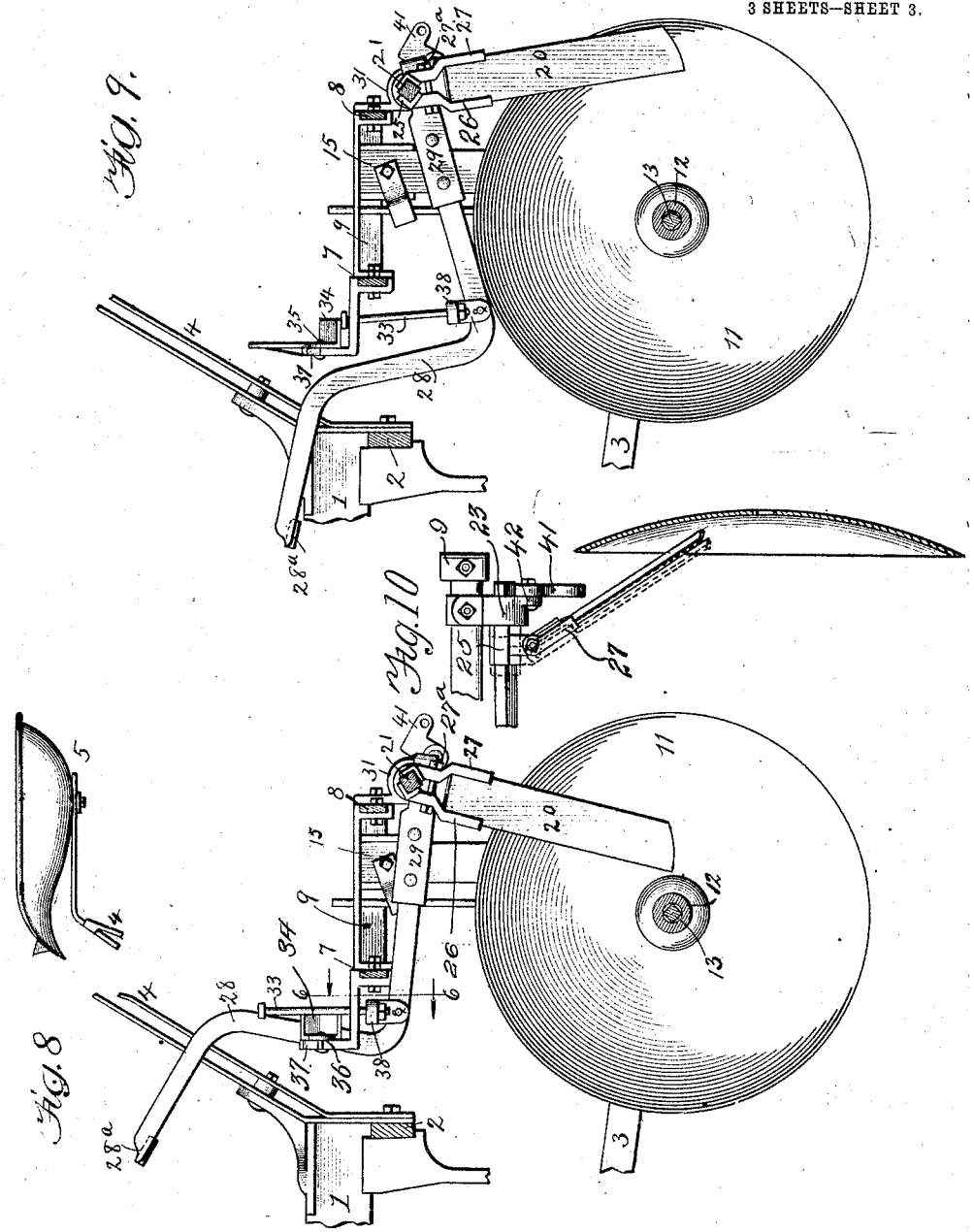

UNITED STATES PATENT OFFICE.

CHARLES E. WHITE, OF MOLINE, ILLINOIS, ASSIGNOR TO DEERE & MANSUR COMPANY, OF MOLINE, ILLINOIS, A CORPORATION OF ILLINOIS.

HARROW.

1,020,530.

Specification of Letters Patent. Patented Mar. 19, 1912.

Application filed June 14, 1907. Serial No. 378,979.

*To all whom it may concern:*

Be it known that I, CHARLES E. WHITE, citizen of the United States, residing at Moline, in the county of Rock Island and State of Illinois, have invented certain new and useful Improvements in Harrows, of which the following is a specification, reference being had therein to the accompanying drawing.
This invention relates to improvements in disk harrows, that is, harrows of the class in which use is made of gangs of disks oppositely arranged in relation to a draft frame arranged at the longitudinal center of the machine.

The improvements pertain more particularly to the means for mounting, moving or adjusting and locking the scraper devices, namely, the means which are used for cleaning the concave surfaces of the disks.

The manner of constructing and operating parts embodying my improvements will be readily understood from the description below, considered in connection with the drawings.

Figure 1 is a plan view of a disk harrow embodying my improvements. Fig. 2 is a section of the rock shaft for the scrapers and showing part of the lever attached thereto. Fig. 3 is a vertical section of one of the disks and the adjacent part of its shaft and thimbles. Fig. 4 is a rear view of the inner part of one of the disk gangs on a larger scale. Fig. 5 is a section taken on the line 5—5 of Fig. 4. Fig. 6 is a section on the line 6—6 of Fig. 8. Fig. 7 is a detail view of two parts shown in Fig. 6. Fig. 8 is a section on the line 8—8 of Fig. 1. Fig. 9 is a section similar to that in Fig. 8, but showing the scraper-supporting mechanism in the opposite position. Fig. 10 is a rear view, parts being shown in vertical section, of the inner end of one of the gangs of disks, the parts shown being in position to have the scrapers engage with the disks.

The implement shown in the drawings is constructed with draft devices or a frame at A, having a wheel supporting frame or truck frame at B, and at the rear connected to the frame C, C for the disk gangs.

The draft devices comprise a tongue 1, a cross-bar 2, and rearwardly diverging drag-bars 3, 3. The cross-bar 2 has a somewhat elevated central part at the ends of which there are legs extending downward and the lower parts of these are turned backward, as at 6, for attachment to the gang boxes. The draft bars 3 are connected to the forward part of the tongue 1 and extend backward and outward somewhat, they at their rear ends being connected to the boxes of the gang-axles at the places where the ends of the cross-bars 2 are united therewith.

At the rear end of the tongue the seat 5 is supported by means of suitable bars 4 which extend upward and backward for carrying it.

Each gang frame comprises a front bar 7, a rear bar 8, and cross-bars 9, and intermediate cross-plates or bars at 10, these being arranged in approximately the same horizontal planes and being situated above the disks 11, 11. The disks are mounted upon an axle composed of the sleeve sections 12, 12, and the angular central rod or shaft 13 upon which the sleeve parts 12 are fitted, each of the disks 11, 11 being clamped between two of the sleeves or thimbles. The shaft thus built up is mounted in a box 14 approximately near the center, longitudinally, there being also boxes 16 and 19 near the ends. The upper part of the frame is connected to the boxes by means of vertical standards 15.

The boxes at the inner ends of the gangs are flexibly connected to the links 17 which at their forward ends are joined to the levers 18, the latter being pivoted to the tongue and each being provided with a detent and segment. By means of the levers 18 the gangs may be adjusted to different angular positions relative to the lines of draft and, as the connections of the gang with the frame bars 2 and 3 and the bars 17 are somewhat loose, the ends of the gangs are free to rise and fall somewhat.

The scrapers for the disks are indicated by 20, 20. They are rigidly connected to a rock-shaft 21 mounted behind and a little below the frame parts 7, 8, 8, in bearings at 22, 23, 24, at the center and at the ends of the shaft. The scrapers can be of any suitable shape. As shown, they are elongated knife-like parts indicated as aforesaid by 20, and each at the upper end is held in a clamp 25 which is adjustably secured to the rock shaft 21. These clamps consist of the two parts 26, 27, and the bolt 27ª, the parts 26, 27 being shaped at their upper ends to fit the shaft 21 and at their lower ends to fit the scraper bar. One of the clamps of each gang, indicated on the drawings by 25ª, has its part 27 formed with a lug or arm so that a spring 32 coiled around the rock shaft can engage with it and also with some stationary part, as, for instance, with the bar 8 of the frame, this spring acting both to tend to push the bar 21 longitudinally inward and also to rock it downward.

The spring 32, as above remarked, tends normally to rock the shaft 21 in such way as to bring the lower ends of the scrapers toward the disk shafts; that is, bring them to the positions shown as occupied by the scraper 20 in Fig. 8. At such time the scrapers will be in position to clean the central parts of the disks. When it is desired to draw them away from the centers and have them so situated as to act upon the peripheral parts of the disks it is accomplished as follows: 28 indicates a lever which at its rear end is secured to a casting 29 having a socket part 30 which is clamped to the rock shaft 21 by means of a stirrup bolt 31, see Fig. 2. This lever is shaped so as to extend from the rock shaft forward under the top bars of the gang frame, then upward to a position where it can be readily reached by the driver's foot, having at its front end a foot-rest 28ª. When the operator presses down upon this lever with his foot he rocks the shaft 21 and throws the scrapers 20 from their innermost to their outermost positions; and inasmuch as the scrapers are held in these outer positions during the greater part of the time of their use, I have combined with them a lock or stop which will hold them when so placed but which can be at any time easily and quickly opened to permit them to return to the center. This lock comprises a pin or bolt 33 and an opposing vibratable stop 34. The bolt 33 is threaded through a shoulder bracket 38 which is secured to the foot lever 28, the bolt being adjustably secured in position by means of a lock nut. The bolt extends upward through a perforation in a casting 37 mounted upon the front frame bar 7 and upon which, at 35, the stop 34 is pivotally mounted. Said stop member is provided with a handle part 36 which carries a flange or lug 36ª adapted to engage shoulders 39 and 40, on the bracket 37, to limit the movement of said stop member.

When the foot lever is forced down to the position shown by dotted lines in Fig. 6, the handle 36 may be raised by the hand or the foot of the operator, thus bringing the stop 34 in position above the head of the stop bolt 33, and the parts are maintained in such position when the foot of the operator is removed from the lever 28 by the upward pressure of bolt 33 due to the spring 32. When it is desired to release lever 28, the operator depresses it slightly with his foot, thus allowing the stop member to fall under the action of gravity and free the bolt 33 for upward movement.

Provision is also made in the mechanism herein shown for holding all of the scrapers of a gang away from the disks. This is done by moving the rock-shaft 21 longitudinally outward far enough to release the scrapers and locking it against movement inward under the action of the spring 32. At 41 there is a rocking-plate. It is pivoted to an ear or projection 42 formed upon the bearing 23. When this plate 41 is turned back, as shown in Figs. 5 and 10, the rock-shaft 21 projects some distance through the bearing 23. When it is desired to hold the rock-shaft in its outermost position, it is forced outward either by hand or by depression of the foot lever 28, until its end lies in the bearing 23 and then the plate 41 is carried over and dropped into the position shown in Figs. 1 and 4, and by the dotted lines in Fig. 5, it thus serving as a stop to prevent the shaft from returning to its normal position; and when the shaft is thus held by the plate the scrapers, if in their normal position near the axis of the disks, are held out of contact with the disks; at the same time the scrapers are free to oscillate as before, under the action of foot lever 28 and spring 32, but they now swing in planes and out of contact with the disks until they approach the peripheral parts thereof when they come into operative engagement. The value of this feature of my invention will be appreciated by those familiar with the wide variety of conditions under which such implements are worked. In wet sticky soil the constant operation of the scrapers in engagement with all parts of the disks from the axis to the periphery may be required, while in dry soil, they may be needed only at intervals. In the latter case the scrapers can be thrown off thus eliminating the wear and lightening the draft, and at the same time, the scrapers may instantly be thrown outward into engagement with the peripheral parts of the disks, such engagement being sufficient, in a soil of the character in question, to keep the disks clean. When the scrapers are thrown outward as last described, they can, if it be desired, be locked in the outer position by the lock 33, 34. In some cases it will be advantageous to have the scrapers locked off and be able to swing them into proximity to but not into contact with the peripheral parts of the disks. This can be accomplished by adjusting the scrapers 20 on their supporting shaft 21, it being necessary only to loosen the clamping bolts 27ª to make such adjustment. Also in working trashy soil, under some conditions, the swinging of the scrapers, when thrown off the disks, will be effective to clear the disks of roots or other trashy materials.

I do not in the present application present claims involving the lock which holds the scrapers at the periphery of the disks, as claims to this feature of broad or general application are presented in my co-pending application, Ser. No. 621,578, filed April 17, 1911, and as claims to this feature in combination with other disk harrow parts are presented in my co-pending application, Ser. No. 670,412, filed January 10, 1912, both of said co-pending applications being divisions of the present application.

What I claim is:

1. In a disk harrow, the combination with a gang frame and a gang of disks mounted therein, of scrapers for the disks adapted to be moved from points near the axis toward and from the peripheries of the disks, means for pressing the scrapers toward the disks and means for positively holding the scrapers out of contact with the disks against the action of the pressing devices, substantially as set forth.

2. In a disk harrow, the combination with a gang frame and a gang of disks mounted therein, of scrapers for the disks adapted to be moved from points near the axis toward and from the peripheries of the disks, means for pressing the scrapers toward the disks and means operable at will for positively holding the scrapers against the action of the pressing devices, substantially as set forth.

3. In a disk harrow, the combination with a gang frame and a gang of disks mounted therein, of scrapers adapted to have their operative parts moved from points near the axis toward and from the peripheries of the disks, a spring for pressing the scrapers toward the surfaces of the disks, and means for holding the scrapers away from the disks against the action of the spring, substantially as set forth.

4. In a disk harrow, the combination with a frame and a disk carried thereby, of a scraper, a scraper-carrier means for moving the scraper from points near the axis toward and from the periphery of the disk, means for automatically moving the scraper toward the concave side of the disk, and means for holding the scraper off the disk against the action of the said automatic means, substantially as set forth.

5. In a disk harrow, the combination of a frame, a disk carried thereby, a scraper support, a scraper adjustable relative to the said support and to the disk, means for moving the scraper from the axis toward and from the periphery of the disk, a spring for moving the scraper bodily toward the disk, and means for resisting at will the action of the spring in its pressure of the scraper upon the disk, substantially as set forth.

6. In a disk harrow, the combination of a frame, a disk, a scraper movable transversely to the disk axis and also movable toward and from the concave surface of the disk, a spring for moving the scraper toward the said concave surface and a movable stop for resisting the action of the spring when the scraper is near the axis of the disk, substantially as set forth.

7. In a disk harrow, the combination with a gang frame and a gang of disks mounted therein of a series of scrapers for the said disks respectively adapted to be moved transversely of the axis of the disks, a support for the scrapers, means for pressing the scrapers toward the concave sides of the disks, and a movable stop at the inner end of the scraper support, for resisting the action of the aforesaid means, substantially as set forth.

8. The combination with a gang frame and disks carried thereby, of scrapers, a longitudinally movable scraper carrier, a spring adapted to move the scrapers toward the disks, and a rocking stop 41 adapted to be moved into and out of the path of the scraper carrier, substantially as set forth.

9. In a disk harrow, the combination of a frame, a gang of disks therein, scrapers for the disks movably mounted in said frame, means for alternately moving the scrapers to positions adjacent to the central parts of the disks and adjacent to the peripheral parts of the disks, devices common to the several scrapers for holding them yieldingly against the disks while near the axis of the disks, and means adapted to hold the scrapers away from the disks against the action of the last named devices when the scrapers are near the axis of the disks.

10. The combination of the disk, the carrier or frame therefor, the scraper on the said carrier, means for positively holding the operative part of the scraper in a position near the axis of the disk and away from the surface of the disk, means for holding it in another position against the surface of the disk and near its axis, and means for moving the operative part of the scraper from either of said inner positions to a third position at or near the periphery of the disk.

11. The combination of a disk, a frame or carrier therefor, a scraper on the carrier having its operative part movable transversely of the axis of the disk, devices for holding the operative part of the scraper in a position away from the surface of the disk and near the axis thereof and means whereby the scraper can at will be moved from the said position to an outer position near the periphery of the disk, one of said holding devices being adapted to return the scraper from its outer to its inner position.

12. The combination of a disk, a frame or carrier therefor, a scraper on the carrier having its operative part movable transversely of the axis of the disk, devices which normally positively hold the operative part of the scraper away from the surface of the disk in a position near the axis of the disk, and means whereby the scraper can, at will, be moved away from the said position to an outer position near the periphery of the disk.

13. The combination of the disk, a supporting frame therefor, a disk scraper carried by said frame, means for alternately moving the scraper to a position adjacent to the central part of the disk and adjacent to the peripheral part of the disk, and means comprising a spring for holding the scraper near the axis of the disk in either of several positions relative to the face of the disk.

14. The combination of the disk, the frame or carrier therefor, the scraper adapted to have its operative part removed from an operating position near the axis to an operating position near the periphery of the disk, a scraper support on the disk frame adapted to move the scraper toward and from the face of the disk, and means for positively holding the scraper support against movement toward the disk, substantially as set forth.

15. The combination of the disk, the carrier or frame therefor, the scraper movable transversely of the axis of the disk and movable toward and away from the face of the disk, a single spring adapted to impart to the scraper one part of each of the said movements, and arranged to normally hold the scraper at an innermost position near the axis of the disk, and means for holding the scraper away from the central part of the disk against the action of the spring.

16. The combination with the disk and the frame therefor, of a scraper having its operative part movable toward and from the axis of the disk, and means for supporting and guiding the scraper to cause its operative part to move in a definite path so as to contact only with the peripheral part of the disk and move free of contact with the central part of the disk, substantially as set forth.

17. The combination with the disk and the frame therefor, of a scraper having its operative part movable toward and from the axis of the disk, and means for supporting and guiding the scraper to cause its operative part to move in a definite path so as to contact only with the peripheral part of the disk and move free of contact with the central part of the disk, said operative part of the scraper being movable also longitudinally of the disk axis.

18. The combination of a disk, a frame or carrier therefor, a scraper having its operative portion movable toward and from the face of the disk and movable transversely of the axis of the disk, and means for holding it, at will, in either of two paths of transverse movement, substantially as set forth.

19. The combination of a disk, a supporting frame therefor, a scraper for the disk, a carrier for the scraper mounted on said frame and constructed and arranged to move the operative part of the scraper transversely of the axis of the disk and toward and from the face of the disk, and means for holding the operative part of the scraper away from the face of the disk when said operative part is adjacent the central parts of the disk, substantially as set forth.

20. The combination of a disk, a supporting frame therefor, a scraper for the disk, a scraper carrier mounted on the frame, the scraper being adjustably secured to the carrier and the latter being constructed and arranged to move the operative part of the scraper transversely of the axis of the disk and toward and from the face of the disk, and means for holding the operative part of the scraper away from the face of the disk when said operative part is adjacent the central parts of the disk.

21. The combination of a disk, the frame or carrier therefor, the scraper movable transversely to the axis of the disk and movable toward and from the disk face, and means for holding it out of contact with the disk face while near the axis of the disk.

22. The combination of a disk, a frame or carrier therefor, a scraper movable transversely of the disk axis, means for pressing the scraper toward the disk, and means for separating the scraper from the disk and holding it away therefrom while near the axis of the disk.

23. The combination of a disk, a supporting frame therefor, a disk scraper, a scraper carrier on the frame movable transversely of the disk, means for alternately moving the scraper to a position adjacent the central part of the disk, and to a position adjacent the peripheral part of the disk, and devices for holding the scraper carrier and the operative part of the scraper in either of several positions relative to the face of the disk while the scraper is at its innermost position near the axis of the disk.

24. In a disk harrow, the combination with a gang frame and a gang of disks mounted therein, of scrapers for the disks adapted to be moved from points near the axis toward and from the peripheries of the disks, means for pressing the scrapers toward the disks and means for positively holding the scrapers out of contact with the central parts of the disks against the action of the pressing devices, substantially as set forth.

25. In a disk harrow, the combination with a gang frame and a gang of disks mounted therein, of scrapers for the disks adapted to be moved from points near the axis toward and from the peripheries of the disks, means for pressing the scrapers toward the disks and means operable at will for positively holding the scrapers against the action of the pressing devices when the scrapers are near the axis of the disks, substantially as set forth.

26. In a disk harrow, the combination with a gang frame and a gang of disks mounted therein, of scrapers adapted to have their operative parts moved from points near the axis toward and from the peripheries of the disks, a spring for pressing the scrapers toward the surfaces of the disks, and means for holding the scrapers away from the disks against the action of the spring when the scrapers are near the axis of the disks, substantially as set forth.

27. In a disk harrow, the combination with a frame and a disk carried thereby, of a scraper, a scraper carrier, means for moving the scraper from points near the axis toward and from the periphery of the disk, means for automatically moving the scraper toward the concave side of the disk, and means for holding the scraper off the central parts of the disk against the action of the said automatic means, substantially as set forth.

28. In a disk harrow, the combination of a frame, a disk carried thereby, a scraper support, a scraper adjustable relative to the said support and to the disk, means for moving the scraper from the axis toward and from the periphery of the disk, a spring for moving the scraper bodily toward the disk, and means for resisting at will the action of the spring in its pressure of the scraper upon the disk while the scraper is near the axis of the disk, substantially as set forth.

29. The combination of the disk, the carrier or frame therefor, the scraper movable transversely of the axis of the disk and movable toward and away from the face of the disk, a single spring adapted to impart to the scraper one part of each of said movements, and arranged to normally hold the scraper at an innermost position near the axis of the disk, and means for holding the scraper away from the surface of the central part of the disk against the action of the spring.

30. The combination of a disk, a frame or carrier therefor, a scraper movable transversely of the axis of the disk, means for moving the operative part of the scraper longitudinally of the said axis away from the face of the disk, and means for preventing the return of the scraper toward the disk while near the axis thereof, substantially as set forth.

31. The combination with the disks of the spring-held carrier, the scrapers rigid with the carrier, means for holding the operative portions of the scrapers away from the surfaces of the central parts of the disks, and means for rocking the scrapers transversely of the axis of the disks and swinging their operative portions nearer the surfaces of the peripheries of the disks.

In testimony whereof I affix my signature, in presence of two witnesses.

CHARLES E. WHITE.

Witnesses:
N. A. PETERSON,
O. A. TREFZ.